United States Patent
Pavan et al.

(10) Patent No.: US 7,536,071 B2
(45) Date of Patent: May 19, 2009

(54) OPTICAL CABLE FOR COMMUNICATION

(75) Inventors: Massimiliano Pavan, Verdello (IT);
Massimo Pizzorno, Milan (IT);
Alessandro Ginocchio, Sesto San Giovanni (IT); Davide Ceschiat, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 31 days.

(21) Appl. No.: 11/663,757

(22) PCT Filed: Sep. 27, 2004

(86) PCT No.: PCT/EP2004/010811
§ 371 (c)(1),
(2), (4) Date: Oct. 9, 2007

(87) PCT Pub. No.: WO2006/034722
PCT Pub. Date: Apr. 6, 2006

(65) Prior Publication Data
US 2008/0212927 A1  Sep. 4, 2008

(51) Int. Cl.
*G02B 6/44* (2006.01)
*C08K 3/00* (2006.01)
*H02G 15/00* (2006.01)

(52) U.S. Cl. .................. 385/103; 385/100; 385/102; 523/173

(58) Field of Classification Search .......... 385/100, 385/102, 103, 105, 106, 109, 112, 110, 141, 385/143, 145; 523/173
See application file for complete search history.

(56) References Cited

U.S. PATENT DOCUMENTS

| 4,612,155 A | 9/1986 | Wong et al. ............. 264/176 R |
| 4,617,360 A | 10/1986 | Bienfait .................... 526/114 |
| 4,644,044 A | 2/1987 | Gloriod et al. ............ 526/272 |
| 4,645,298 A | 2/1987 | Gartside, III ........... 385/100 X |
| 4,703,997 A | 11/1987 | Ijiri et al. ............... 385/100 X |

(Continued)

FOREIGN PATENT DOCUMENTS

DE   199 61 657   7/2001   ............. 385/100 X (Continued)

OTHER PUBLICATIONS

Final Draft International Standard; "IEC 60794-1-2 Ed 2.0: Optical Fibre Cables—Part 1-2: Generic Specification—Basic Optical Cable Test Procedures", pp. 1-102, (2003).

(Continued)

*Primary Examiner*—Brian M Healy
(74) *Attorney, Agent, or Firm*—Finnegan, Henderson, Farabow, Garrett & Dunner, L.L.P.

(57) ABSTRACT

An optical cable for communication includes at least one micromodule, wherein the micromodule is blocked with respect to the propagation of water. The at least one micromodule includes at least one optical fiber, a retaining element for housing the at least one optical fiber, and a thixotropic filling compound arranged within the retaining element. The filling compound is thixotropic, has a viscosity higher than or equal to 700 Pa·s at zero shear rate and at a first temperature of 20° C., a loss modulus G" lower than or equal to 3000 MPa at 1 Hz and at a second temperature of −45° C., and is compatible with the retaining element.

39 Claims, 1 Drawing Sheet

U.S. PATENT DOCUMENTS

| | | | |
|---|---|---|---|
| 4,767,182 A | 8/1988 | Parfree et al. | 385/100 X |
| 4,798,853 A | 1/1989 | Handlin, Jr. | 523/173 |
| 5,671,312 A | 9/1997 | Jamet | 385/100 |
| 5,751,880 A | 5/1998 | Gaillard | 385/109 |
| 5,911,023 A | 6/1999 | Risch et al. | 385/100 |
| 6,160,939 A | 12/2000 | Sheu | 385/109 |
| 6,278,824 B1 | 8/2001 | Bosisio et al. | 385/100 X |
| 6,937,802 B2 | 8/2005 | Jamet et al. | 385/106 |
| 2002/0041744 A1 | 4/2002 | Anelli et al. | 385/112 X |
| 2003/0049002 A1 | 3/2003 | Bosisio et al. | 385/109 |
| 2003/0168243 A1 | 9/2003 | Jamet et al. | 174/113 R |
| 2008/0212927 A1* | 9/2008 | Pavan et al. | 385/103 |

FOREIGN PATENT DOCUMENTS

| | | | |
|---|---|---|---|
| EP | 0 182 530 | 5/1986 | 385/100 X |
| EP | 0 377 314 | 7/1990 | 385/100 X |
| EP | 0 398 604 | 11/1990 | 385/100 X |
| EP | 0 957 383 | 11/1999 | 385/100 X |
| EP | 1 426 804 | 6/2004 | 385/100 X |
| GB | 2 091 745 | 8/1982 | 385/100 X |
| WO | WO 93/05113 | 3/1993 | 385/100 X |
| WO | WO 2004/034115 | 4/2004 | 385/100 X |
| WO | WO 2004/059360 | 7/2004 | 385/100 X |
| WO | WO 2006/034723 | 4/2006 | 385/100 X |

OTHER PUBLICATIONS

H.A. Barnes et al.; "An Introduction to Rheology", $1^{st}$, Ed., Contents pp. vii-ix, Chapter 2, pp. 16-25, (1989).

* cited by examiner

OPTICAL CABLE FOR COMMUNICATION

CROSS REFERENCE TO RELATED APPLICATION

This application is a national phase application based on PCT/EP2004/010811, filed Sep. 27, 2004, the content of which is incorporated herein by reference.

BACKGROUND OF THE INVENTION

1. Field of the Invention

The present invention relates to an optical cable for communication comprising at least one micromodule blocked with respect to the propagation of water, as well as to such a micromodule.

Transmission elements, in particular coated optical fibers, used in optical cables are typically housed, either individually or as a group, in buffering materials or elements. For instance, one or more optical fibers, e.g. arranged in a group, bundle or ribbon of optical fibers, may be housed in a tube or flexible sheath (hereinafter referred to as "retaining element"), which may be made, for example, of polymeric material. The optical fiber(s) together with its(their) retaining element is(are) generally referred to in the art as "optical unit", "micromodule" or "module". Usually, said retaining element has a thin thickness and is endowed with specific mechanical properties (in particular, elastic modulus, ultimate tensile strength and elongation at break) so as to allow an easy access to the optical fiber(s) in order to facilitate both the connection between the optical fiber(s) and an user equipment, and the interconnection between cables. Said retaining element is also generally referred to as "microsheath" or "minisheath".

Moreover, said retaining element, usually, has an axial stiffness relatively low so as to slightly affect the fiber(s) attenuation due to mechanical stresses and strains which may occur during the thermal cycles to which said fiber(s) is(are) usually subjected.

An optical cable may contain a single micromodule or a plurality of micromodules. Said single micromodule or said plurality of micromodules are generally referred to as the optical core of the cable. The optical core is in turn typically inserted into a protecting sheath usually made of polymeric material.

Usually, each micromodule may comprise a bundle of optical fibers, typically in a number comprised between 2 and 12, housed in a retaining element as defined above.

The optical fibers are arranged parallel or according to an open helix pattern (or S-Z stranding) around the axis of the micromodule, i.e. the optical fibers are stranded around the axis of the micromodule in sections with a first direction of stranding (S-shaped) alternating with sections with an opposite direction of stranding (Z-shaped).

Within each micromodule, the optical fibers may be arranged with or without clearance between their outer envelope and the inner surface of the retaining element of the micromodule. If no clearance is left between the optical fibers and the retaining element, the micromodule is called tight, while in the opposite case, i.e. if there is a clearance between the optical fibers and the retaining element, the micromodule is called loose.

In the present description and in the following claims, a micromodule shall be indicated as loose when the optical fibers are mechanically decoupled from the retaining element. Consequently, for a suitable length of a micromodule of the loose type (e.g. 1 meter) it is possible to extract a single optical fiber independently of the other optical fibers. Usually, it is possible to operate as disclosed above when the inner diameter of the retaining element is at least 1% larger than the diameter of the smallest circle enveloping the optical fibers defined therein, otherwise the micromodule shall be indicated as tight.

As already reported above, the micromodule allows an easy access to the optical fiber(s) housed therein both at the free end of the micromodule and at an intermediate position of the micromodule by simply tearing and slipping off the retaining element. By exerting a moderate combined pressure and tensile strength with the fingers, in fact, a predetermined length of retaining element can be easily removed so as to access to the optical fiber(s) remained uncovered.

Consequently, the mechanical properties of the polymeric material constituting the retaining element indicate that, apart from the containing function of the latter, one of the main aims of providing micromodules in optical cables is that of grouping different bundles of optical fibers so as to allow an easy identification of the different bundles. Such identification may be attained, for example, by providing micromodules with respective retaining elements having different colors.

The arrangement of the optical fibers in micromodules allows to assemble a high number of optical fibers in a relatively small optical cable (e.g. a cable with up to 144 optical fibers may have an external diameter lower than or equal to about 13 mm or less; cable with a lower number of fibers may have a correspondingly lower diameter), which makes cables including micromodules particularly suitable for urban distribution networks.

In the present description and in the following claims, the expression "blocked with respect to the propagation of water" means that the propagation of water is prevented or limited both in the micromodule and in the optical cable containing the same, in the sense that both the micromodule and the optical cable containing the same pass the test according to method F5B provided by International Standard IEC 60794-1-2: further details regarding the above test will be given in the examples which follow. The propagation of water is mainly intended as a spreading along the longitudinal direction of the micromodule which results in a progressive filling thereof.

2. Prior Art

Optical cables for communication comprising at least one micromodule (usually a plurality of micromodules) blocked with respect to the propagation of water, are known. For example, U.S. Pat. No. 5,671,312 discloses optical cables comprising micromodules water-blocked by means of an oil having a viscosity comprised between 100 and 5000 mPa·s, such as for example a silicone oil. Each optical fiber is provided with such an oil by means of an applicator member such as a felt pad associated with an oil feed member and located upstream of the extrusion head used to extrude the retaining element around the optical fibers.

US patent application 2003/0168243 discloses an optical cable for telecommunication comprising micromodules water-blocked either by means of silicone or synthetic grease, oil or gel. The optical fibers are coated with such filling compounds before the optical fibers are passed through a die for extruding a thin retaining sheath clamping the optical fibers together. The use of swelling powder and/or swelling filaments is also envisaged. U.S. Pat. No. 5,751,880 discloses an optical unit for an optical fiber telecommunication cable, the unit comprising a tube of plastics material in which at least one optical fiber is loosely received, wherein the thickness of said tube is less than or equal to 0.5 mm, and wherein said material has a modulus of elasticity less than 1500 MPa at 20°

C. and a stress/elongation curve without a yield point. Said tube could also contain a material providing sealing in the form of a gel which is not better defined.

Optical cables are also known wherein the optical fiber(s) are inserted in a tube, sometimes called "buffer tube", which usually has a thickness higher than about 0.2 mm, typically of from about 0.3 mm to about 0.8 mm.

For example, International Patent Application WO 2004/034115 discloses buffer tubes, core tubes or slotted core fiber optic cable components, which are made of an extrudable blend of highly crystalline polypropylene and an impact modifying polymer. As disclosed in the above-mentioned patent application, said buffer tubes, which are modeled as having a 3.3 mm outside diameter and a 0.76 mm wall thickness, are typically filled with an optic cable hydrocarbon-based grease incorporating hydrocarbon oils surrounding the fibers and eliminating air space. The above-mentioned grease (also referred to as "gel") is said to provide a barrier against water penetration, which is detrimental to the optic transmission performance.

U.S. Pat. No. 5,911,023 discloses optical cable components such as buffer tubes, filler rods or jackets, made of a thermoplastic polyolefin, preferably propylene or ethylene homopolymer, a propylene-ethylene copolymer, or a terpolymer including propylene and ethylene, characterized by a high melt flow index. The use of said material having a high melt flow index results in a substantial improvement in buffer tube crystallinity and crystallization rates, improved buffer tube crush resistance, reduced post extrusion shrinkage, improved gel compatibility, and improved excess fiber length control. The gel in the buffer tube is said to be a thixotropic, water blockable gel such as mineral gels, or petroleum gels.

SUMMARY OF THE INVENTION

The optical cables disclosed by the above reported prior art, however, show some drawbacks.

As a matter of fact, in the prior art optical cables comprising micromodules water-blocked, for example, by means of oil, the water-blocking action exerted by the oil is unsatisfying because incomplete and ineffective in time, particularly for the following reasons. The oil leaks out from the micromodules when the micromodules are subjected to a water head or due to a migration effect of the oil through the retaining element after a long storing period. The Applicant has found that, even by using oil having a high viscosity (higher than 5000 mPa·s), such leakage cannot be avoided but only postponed in time.

Furthermore, also an increase of the ambient temperature, which may correspond to a decreasing of the oil viscosity, may cause a leakage of the oil from the micromodules. This is particularly undesirable both during the service life of the cable and during a possible long storing period of the micromodules or of the cable incorporating the same which have been previously coiled in a bobbin.

As disclosed above, in US patent application 2003/0168243 and in U.S. Pat. No. 5,751,880, the interspaces located among the optical fibers within the micromodules are filled by means of a gel.

However, the Applicant has observed that no indication was made in such references about the chemical, physical or Theological properties of the gel used, about the degree of the micromodule volume filled by the gel, as well as about the effectiveness of such a gel to prevent water propagation along the micromodule.

Within the present invention, the Applicant has perceived that in order to prevent or limit water propagation through the micromodule by using a filling compound, said filling compound is required to have a combination of specific properties having selected values.

In particular, the Applicant has found that a filling compound suitable for use within a micromodule should be thixotropic, so as to permit a radial movement of the optical fiber(s) in the micromodule without decreasing the water-blocking action of the filling compound.

A thixotropic filling compound, in fact, has an apparent viscosity which decreases when subjected to a constant shear stress or shear rate and which gradually recovers to the original value when the shear stress or shear rate is removed. Such thixotropic behavior is time dependent. Further details about said thixotropic behavior may be found, for example, in "An Introduction to Rheology" ($1^{st}$ Ed.-1989), by H. A. Barnes, J. F. Hutton and K. Walters, pp. 24-25.

Accordingly to said definition, a thixotropic filling compound applied in the interspaces between and around the optical fiber(s) housed in a retaining element is only temporarily locally fissured by the optical fiber(s) movement(s) when, in response to a cable strain, the optical fiber(s) has/have to find a new position of equilibrium. After having found said new position of equilibrium the filling compound, thanks to its thixotropic behavior, recovers its own integrity and fills again all the interspaces within the retaining element of the micromodule.

Furthermore, the Applicant has perceived that a filling compound suitable for use within a micromodule in order to properly prevent or limit the propagation of water through the same, in addition to the above-mentioned thixotropic behavior, should have a specific viscosity. As a matter of fact, said viscosity should be accurately selected in order to prevent or limit the propagation of water through the micromodule, so as to avoid any drip phenomenon at the operating temperature of the cable (usually comprised between about −50° C. and about 70° C.), as well as to maintain the transmission capability of the optical fibers even at low temperature.

Moreover, the Applicant has also found that the filling compound should be selected by taking into account its compatibility with the polymeric material of the retaining element. As a matter of fact, the Applicant has noticed that depending on the particular material, typically of polymeric nature, of said retaining element, and particularly when the thickness of the same is thin, the use of the filling compounds used in loose buffer tubes optical cables, in particular to fill the buffer tubes, may not give the expected results. In particular, the Applicant has found that a remarkable reduction on the mechanical properties (in particular, ultimate tensile strength and elongation at break) of said retaining element may occur.

The Applicant has therefore perceived the need of providing a micromodule wherein the propagation of water through the micromodule is prevented or limited in an effective manner, which is not subjected to drip phenomena within the operating temperature range of the cable (e.g. around 70° C.), and which maintains a transmission capability even at low temperature (e.g. around −45° C.). Moreover, the Applicant has perceived the need of preventing the reduction of the mechanical properties of the polymeric material of the retaining element caused by the interaction of the filling compound and the polymeric material of the retaining element.

The Applicant has found that it is possible to satisfy such different requirements by using a filling compound having predetermined Theological properties, namely a thixotropic filling compound having a viscosity higher than a predetermined value at 20° C., and a loss modulus G" lower than a predetermined value at a selected low temperature (e.g. −45° C.).

With regard to the water-blocking property, in particular, the Applicant has observed that there is a strong correlation between the zero shear viscosity of the filling compound at the operating temperature of the micromodule of the cable (the ambient temperature, e.g. 20° C., being a temperature representative of the service life of the cable) and the capability of said filling compound of preventing or limiting the propagation of water through the micromodule filled with said filling compound.

With regard to the transmission capability, the Applicant has observed that there is a direct correlation between the loss modulus G" of the filling compound at a selected low temperature (e.g. at −45° C.), and the optical properties of the micromodule.

In a first aspect thereof, the present invention therefore relates to an optical cable for communication comprising at least one micromodule blocked with respect to the propagation of water, wherein said micromodule comprises:

at least one optical fiber;

a retaining element for housing said at least one optical fiber; and a thixotropic filling compound arranged within said retaining element, said filling compound having a viscosity higher than or equal to 700 Pa·s at zero shear rate and at a first temperature of 20° C. and a loss modulus G" lower than or equal to 3000 MPa at a second temperature of −45° C. and at a frequency of 1 Hz; said thixotropic filling compound being compatible with said retaining element.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and in the following claims, the expression "compatible with said retaining element" means that the filling compound does not cause any significant swelling of the retaining element capable of deteriorating its mechanical properties, in the sense that the micromodule passes the test according to CM37 Standard, item 6.2, from France Telecom: further details regarding the above test will be given in the examples which follow.

In particular, a viscosity value higher than or equal to 700 Pa·s at zero shear rate and at 20° C. advantageously allows both to achieve an effective barrier property with respect to the propagation of water in the micromodule(s) and to avoid undesired leakage phenomena of the filling compound from the micromodule(s) during the service life and the possible periods of storing of the micromodule(s) (and of the corresponding cable). Preferably, the viscosity of the filling compound is comprised between 800 and 40000 Pa·s, more preferably between 850 and 20000 Pa·s at zero shear rate and at 20° C.

Preferably, the filling compound has a loss modulus G" comprised between 300 MPa and 3000 MPa and, more preferably between 500 MPa and 2500 MPa, at a temperature of −45° C and at a frequency of 1 Hz.

Preferably, the filling compound fills at least 85% of the volume defined within the retaining element and the optical fiber(s). Advantageously, in this way the propagation of water through the micromodule is completely prevented or at least effectively limited.

More preferably, the filling compound fills at least 90% of the volume defined within the retaining element and the optical fiber(s).

Preferably, the filling compound comprises a structured hydrophobic material such as, for example, a gel obtained from at least one liquid and from at least one thickening agent.

The liquid is preferably selected from silicone oils, preferably polydimethylsiloxane oils; fluorinated oils, preferably perfluoropolyether oils, or mixtures thereof.

The thickening agent is preferably selected from the group comprising: silica, bentonite, polytetrafluoroethylene, or mixtures thereof.

Alternatively, the thickening agent may include a polymer, preferably an elastomeric polymer, more preferably a block copolymer, such as for example styrene-ethylene-propylene (SEP), styrene-ethylene-butylene (SEB), styrene-ethylene-butylene-styrene (SEBS), or mixtures thereof. Examples of polymers suitable for the purpose may be found in patent U.S. Pat. Nos. 6,278,824, 6,160,939, 4,798,853 and in patent application WO 93/05113. Combinations of an inorganic and an organic thickening agent may also be envisaged, such as for example a mixture of silica and a polymer, preferably an elastomeric copolymer of the above-mentioned type.

Such preferred filling compounds are chemically compatible with the materials normally employed to form the protective coating layer conventionally applied on the optical fibers (for example UV curable acrylate coating). In addition, said preferred filling compounds are chemically compatible with the polymeric materials employed to form the retaining element of the micromodules, such as for example a thermoplastic polymeric composition based on olefin polymers. Such compositions are preferably of the LSOH type (Low Smoke Zero Halogen, i.e. halogen free and having a low emission of smoke) and are preferably based on ethylene copolymers, optionally including mineral fillers as described in more detail in the following.

Preferably, the above-mentioned liquid intended to form the gel by the addition of a thickening agent is a silicone oil. Preferably, said silicone oil has a viscosity comprised between 100 and 13000 mPa·s at 20° C., more preferably between 1000 and 6000 mPa·s at 20° C.

Preferably, the thickening agent comprises fumed silica, more preferably a mixture of fumed silica and of an at least partially silanized silica. Advantageously, the partial silanization of the hydroxyl groups renders the silica hydrophobic, which allows to obtain an improved resistance to humidity.

Preferably, the ratio by weight between the non-silanized silica and the silanized silica is comprised between 0.5 and 5, more preferably between 0.65 and 4.30 so as not to negatively affect the thixotropy effect ensured by the non-silanized silica.

Preferably, the ratio by weight between the liquid and the thickening agent is comprised between 20/1 and 6/1, more preferably between 20/1 and 10/1.

Preferably, the retaining element has a thickness which is comprised between 0.05 and 0.2 mm, more preferably between 0.1 and 0.2 mm.

Preferably, the thermoplastic polymeric composition intended to form the retaining element comprises:

(a) at least one first olefin polymer, and (b) at least one inorganic filler.

More preferably, said thermoplastic polymeric composition further comprises (c) at least one second olefin polymer selected from:

($c_1$) terpolymers of at least one α-olefin, at least one acrylic acid ester, and at least one α,β-olefinically unsaturated dicarboxylic acid reagent or its derivatives such as, for example, anhydrides, metal salts, imides, esters, or at least one glycidyl acrylate;

($c_2$) terpolymers of ethylene, at least one α,β-olefinically unsaturated dicarboxylic acid anhydride, and at least one vinyl ester of a saturated carboxylic acid;

($c_3$) olefin polymers grafted with at least one ethylenically unsaturated monomer. Preferably, said thermoplastic polymeric composition has an elastic modulus lower than or equal to 500 MPa, more preferably comprised between 50 and 500 MPa, still more preferably between 150 and 400 MPa, at a temperature of 20° C.

Preferably, said thermoplastic polymeric composition has an ultimate tensile strength lower than or equal to 12 MPa, more preferably comprised between 5 and 10 MPa. Preferably, said thermoplastic polymeric composition has an elongation at break lower than or equal to 100%, more preferably comprised between 30 and 80%.

Preferably, said first olefin polymer (a) may be selected from α-olefin polymers including homopolymers, copolymers, terpolymers, or mixtures thereof, containing one or more monomeric units. Polymers of α-olefins containing from 2 to 20 carbon atoms, preferably from 2 to 8 carbon atoms, are preferred.

Specific examples of said α-olefins are: ethylene, propylene, 1-butene, 1-pentene, 4-methyl-1-pentene, 1-octene, 1-decene, 4-ethyl-1-hexene, or mixture thereof.

According to a further preferred embodiment, the first olefin polymer (a) may be selected, for example, from: low density polyethylene (LDPE), linear low density polyethylene (LLDPE), ultra low density polyethylene (ULDPE); atactic polypropylene; high and low density poly-1-butene; poly-4-methyl-1-pentene; ultra-low-molecular weight polyethylene; ethylene-based ionomers; poly-4-methyl-1-pentene; ethylene propylene copolymers; ethylene-propylene-diene copolymers (EPDM); copolymer of ethylene and/or propylene with other copolymerizable monomers such as, for example, ethylene-1-butylene copolymer, ethylene-vinyl acetate copolymer (EVA), ethylene-methyl acrylate copolymer, ethylene-butyl acrylate copolymer (EBA), ethylene-ethyl acetate copolymer, propylene-4-methyl-1-pentene copolymer, ethylene-vinyl alcohol copolymer; ethylene acrylic elastomers such as, for example, ethylene-methyl acrylate-acrylic acid terpolymers; or mixtures thereof. Halogenated olefins, polymers and copolymers, may also be used. Ethylene-butyl acrylate copolymer, ethylene-vinyl acetate copolymer, or mixtures thereof, are preferred.

Examples of the first olefin polymer (a) which may be used and are available commercially are the products known by the name of Lotryl® from Atofina, or Flexirene® from Polimeri Europa.

Alternatively, said first olefin polymer (a) may be selected from copolymers of ethylene with at least one aliphatic α-olefin selected, for example from propylene, 1-butene, isobutylene, 1-pentene, 4-methyl-1-pentene, 1-hexene, 1-octene, 1-dodecene, or mixtures thereof, and optionally a polyene, preferably a diene.

The above copolymer of ethylene with at least one aliphatic α-olefin generally has the following composition: 50 mol %-98 mol %, preferably 60 mol %-93 mol %, of ethylene; 2 mol %-50 mol %, preferably 7 mol %-40 mol %, of an aliphatic a-olefin; 0 mol %-5 mol %, preferably 0 mol %-2 mol %, of a polyene.

Examples of copolymers of ethylene with at least one aliphatic α-olefin which may be used in the present invention and which are currently commercially available are the products Engage® from DuPont-Dow Elastomers, or Exact® from Exxon Chemical.

Preferably, the above-mentioned inorganic filler (b) is intended to control physical parameters, such as mechanical properties and flame retardancy, of the retaining element, as well as to obtain an easy strippable retaining element. For this purpose, the inorganic filler (b) may be selected, for example, from: hydroxides, hydrated oxides, salts or hydrated salts of metals, in particular of calcium, magnesium, aluminum, or mixtures thereof. Said inorganic filler (b) may be used also in admixture with other inorganic fillers such as silicates.

According to a further preferred embodiment, the inorganic filler (b) may be selected, for example, from: magnesium hydroxide (including natural magnesium hydroxide, e.g. from the milled brucite mineral), aluminum hydroxide, aluminum oxide (including kaolin, i.e. an hydrated aluminum silicate), alumina trihydrate, magnesium carbonate hydrate, magnesium carbonate, magnesium calcium carbonate hydrate, magnesium calcium carbonate, or mixtures thereof. Magnesium hydroxide, aluminum hydroxide, alumina trihydrate ($Al_2O_3$ $3H_2O$), or mixtures thereof, are particularly preferred. Minor amounts, generally less than 25% by weight, of one or more inorganic oxides or salts such as CoO, $TiO_2$, $Sb_2O_3$, ZnO, $Fe_2O_3$, $CaCO_3$ or mixtures thereof, may advantageously be added. The above-mentioned metal hydroxides, in particular the magnesium and aluminum hydroxides, are preferably used in the form of particles with sizes which may range from 0.1 μm to 20 μm, preferably from 0.5 μm to 10 μm.

The inorganic filler (b) may be advantageously used in the form of coated particles. Preferred coating materials are saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; or mixtures thereof.

The inorganic filler (b) is preferably present in the thermoplastic polymeric composition in an amount of from 40 parts by weight to 200 parts by weight, preferably from 75 parts by weight to 150 parts by weight, with respect to 100 parts by weight of the first olefin polymer (a).

Examples of inorganic fillers (b) which may be used and are available commercially are the products known by the name of Hydrofy® from Sima, or Atomfor® from Omya.

It has to be noted that the addition of the inorganic filler (b), particularly in amounts equal to or higher than 100 parts by weight with respect to 100 parts by weight of the first olefin polymer (a), may also give advantageous flame retardant properties to the thermoplastic polymeric composition.

Preferably, the terpolymers ($c_1$) may comprise from 50% by weight to 99% by weight of at least one α-olefin, from 0.5% by weight to 40% by weight of at least one acrylic acid ester, and from 0.3% by weight to 10% by weight of at least one dicarboxylic acid reagent or its derivatives, or of at least one glycidyl acrylate.

The α-olefin which may be advantageously used in the preparation of the terpolyrners ($c_1$) may be selected, for example, from α-olefins containing from 2 to 20 carbon atoms, preferably from 2 to 8 carbon atoms. Ethylene, propylene, or mixture of ethylene and propylene, are preferred.

The acrylic acid esters which may be advantageously used in the preparation of the terpolymers ($c_1$) may be selected, for example, from compounds having the following formula:

$CH_2$=$C(R)COOR'$ wherein R represents hydrogen, or a lower alkyl group containing from 1 to 4 carbon atoms such as methyl or ethyl, and R' represents a lower alkyl group having from 1 to 6 carbon atoms.

Specific examples of the acrylic acid esters are: methyl acrylate, ethyl acrylate, butyl acrylate, methyl methacrylate, ethyl methacrylate, ethyl ethacrylate, or mixtures thereof. The $\alpha,\beta$-olefinically unsaturated dicarboxylic acid reagent or its derivatives which may be advantageously used in the preparation of the first terpolymer may be selected, for example, from: maleic acid, maleic anhydride, fumaric acid, mesaconic acid, itaconic acid, citraconic acid, itaconic anhydride, citraconic anhydride, monomethyl maleate, monosodium maleate, or mixtures thereof. Maleic anhydride is preferred.

The glycidyl acrylate which may be advantageously used in the preparation of the terpolymers ($c_1$) may be selected, for example, from compounds having the following formula:

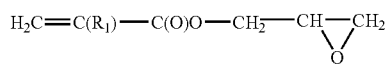

wherein $R_1$ is hydrogen or a lower alkyl group containing from 1 to 6 carbon atoms.

Preferably, $R_1$ is hydrogen, methyl, or ethyl.

Specific example of glycidyl acrylates are: glycidyl acrylate, glycidyl methacrylate, glycidyl ethacrylate, or mixtures thereof.

According to a preferred embodiment, the terpolymers ($c_1$) may be selected, for example, from: ethylene-methyl acrylate-maleic anhydride, ethylene-ethyl acrylate-maleic anhydride, ethylene-butyl acrylate-maleic anhydride, propylene-methyl acrylate-maleic anhydride, propylene-ethyl acrylate-maleic anhydride, ethylene-methyl acrylate-glycidyl methacrylate, ethylene-methyl acrylate-glycidyl acrylate, or mixtures thereof.

The terpolymers ($c_1$) which may be used may be prepared by known techniques such as, for example, by means of a high-pressure free radical polymerization process. A more detailed description of said processes may be found, for example, in patents U.S. Pat. Nos. 4,644,044 and 4,617,36 or in patent application GB 2,091,745.

Examples of terpolymers ($c_1$) which may be used and are available commercially are the products known by the name of Lotader® MAH, or Lotader® GMA from Atofina.

The $\alpha,\beta$-olefinically unsaturated dicarboxylic acid anhydrides which may be advantageously used in the preparation of the terpolymer ($c_2$) may be selected from: citraconic anhydride, itaconic anhydride, tetrahydrophthalic anhydride, maleic anhydride, or mixture thereof. Maleic anhydride is preferred.

The vinyl ester of a saturated carboxylic acid which may be advantageously used in the preparation of the terpolymers ($c_2$) may be selected, for example, from vinyl ester of a saturated carboxylic acid containing from 2 to 6 carbon atoms. Vinyl acetate is preferred.

The terpolymer ($c_2$) is preferably ethylene-vinyl acetate-maleic anhydride.

Examples of terpolymer ($c_2$) which may be used according to the present invention and are available commercially are the products known by the name of Orevac® 9305, or Orevac® 9307 from Atofina.

With regard to the olefin polymers ($c_3$), which are grafted with at least one ethylenically unsaturated monomer, the olefin polymers may be selected, for example, from: homopolymers of ethylene; homopolymers of propylene; copolymers of ethylene and propylene especially copolymers of propylene with minor amounts of ethylene as in impact and random copolymer of propylene; terpolymers of ethylene, propylene and dienes (e.g. so called EPDM); copolymers of ethylene with at least one $C_3$-$C_{10}$ hydrocarbon $\alpha$-olefin; copolymers of ethylene and vinyl acetate, alkyl acrylate or alkyl methacrylate.

Specific examples of the $C_3$-$C_{10}$ hydrocarbon $\alpha$-olefin are: butene-1, hexene-1, octene-1, or mixtures thereof.

Specific examples of the alkyl groups of the acrylates or methacrylates are: methyl, ethyl, propyl, butyl, or mixtures thereof.

The copolymers of ethylene may include both linear low density polyethylene (LLDPE) and very low density polyethylene (VLDPE).

The ethylenically unsaturated monomer may be selected, for example, from ethylenically unsaturated carboxylic acids or derivatives thereof, ethylenically unsaturated carboxylic acid anhydrides, or mixture thereof.

Specific examples of carboxylic acids, which may be selected from mono-, di- or polycarboxylic acids, are: acrylic acid, methacrylic acid, maleic acid, fumaric acid, itaconic acid, crotonic acid, or mixtures thereof.

Specific examples of anhydrides are: itaconic anhydride, maleic anhydride, substituted maleic anhydride (e.g. dimethyl maleic anhydride), nadic methyl anhydride, tetrahydrophthalic anhydride, or mixture thereof. Maleic anhydride is preferred.

Specific examples of unsaturated carboxylic acid derivatives are: salts, amides, imides or esters such as, for examples, mono- and disodium maleate, acrylamide, maleimide, glycidyl methacrylate, dimethyl fumarate, or mixture thereof.

Techniques for the grafting of such monomers onto olefin polymers are known in the art and are described, for example, in patent U.S. Pat. No. 4,612,155, or in European patent application EP-A-0 398 604.

Examples of olefin polymers ($c_3$) grafted with at least one ethylenically unsaturated monomer which may be used according to the present invention and are available commercially are the products known by the name of Fusabond® from DuPont, or Orevac® G from Atofina.

Preferably, the second olefin polymer (c) is present in the thermoplastic polymeric composition in an amount of from 3 parts by weight to 10 parts by weight, more preferably from 5 parts by weight to 8 parts by weight, with respect to 100 parts by weight of the first olefin polymer (a).

The thermoplastic polymeric composition intended to form the retaining element may advantageously comprise antioxidant additives, preferably selected among polymerized trimethyldihydroquinoline, 4,4'-thiobis(3methyl-6t-butyl)phenol; pentaerythrityl-tetrakis[3-(3,5-di-t-butyl-4-hydroxyphenyl)propionate], 2,2'-thiodiethylene-bis[3-(3,5-di-t-butyl-4-hydroxyphenyl)propionate], or mixtures thereof.

Other conventional additives, such as processing coadjuvants, lubricants, pigments, sliping agents, antioxidants and other fillers, may advantageously be added to the thermoplastic polymeric composition.

Processing coadjuvants usually added to the thermoplastic polymeric composition are, for example, calcium stearate, zinc stearate, stearic acid, paraffin wax, silicone rubbers, or mixtures thereof.

According to one preferred embodiment, the optical cable of the invention comprises at least one micromodule which includes a bundle of optical fibers.

According to a further preferred embodiment, particularly suitable for cables having medium-high transmission capability, the optical cable of the invention comprises a plurality of micromodules and at least one outer sheath arranged in a radially outer position with respect to said plurality of micromodules.

In case the optical cable comprises a plurality of micromodules and at least one outer sheath arranged in a radially outer position with respect to the same, the optical cable preferably further comprises at least one reinforcing element longitudinally embedded in said outer sheath, more preferably embedded tangentially to the inner diameter of the outer sheath.

According to a further preferred embodiment, particularly suitable for cables having high-very high transmission capability, the optical cable of the invention further comprises a plurality of tubes. Each of said tubes is arranged in a radially outer position with respect to a plurality of said micromodules and in a radially inner position with respect to said at least one outer sheath.

In case the optical cable comprises a plurality of micromodules so arranged, the optical cable preferably further comprises a central reinforcing element longitudinally extending in a central radially inner position with respect to said outer sheath, said plurality of tubes being stranded around said central reinforcing element.

According to a further aspect, the present invention also provides a micromodule blocked with respect to the propagation of water comprising:

at least one optical fiber;

a retaining element for housing said at least one optical fiber; and a thixotropic filling compound arranged within said retaining element, said filling compound having a viscosity higher than or equal to 700 Pa·s at zero shear rate and at a first temperature of 20° C., a loss modulus G" lower than or equal to 3000 MPa at a second temperature of −45° C. and at a frequency of 1 Hz, said thixotropic filling compound being compatible with said retaining element.

Preferred embodiments of the micromodule of the invention include a retaining element having a thickness of 0.05 to 0.2 mm; a retaining element having a thickness of 0.1 to 0.2 mm; and a retaining element made of a thermoplastic polymeric composition comprising: (a) at least one first olefin polymer, and at least one inorganic filler.

Preferred embodiments of the micromodule of the invention also include a filling compound having a viscosity of 800 to 40000 Pa·s at zero shear rate and at 20° C.; and more preferably, a filling compound having a viscosity of 850 to 20000 Pa·s at zero shear rate and at 20° C.; a filling compound having a loss modulus G" of 300 MPa to 3000 MPa at a temperature of −45° C. and at a frequency of 1 Hz; and more preferably, a filling compound having a loss modulus G" of 500 MPa to 2500 MPa at a temperature of −45° C. and at a frequency of 1 Hz; a filling compound which fills at least 85% of the volume defined within said retaining element, and more preferably a filling compound which fills at least 90% of the volume defined within said retaining element; and a filling compound which comprises a gel obtained from at least one liquid and from at least one thickening agent. Such preferred embodiments of the micromodule of the invention correspond to the preferred embodiments of the optical cable of the invention comprising at least one micromodule already discussed above.

BRIEF DESCRIPTION OF THE FIGURES

Additional features and advantages of the invention will become more readily apparent from the description of some preferred embodiments with reference to the attached drawings in which, for illustrative and not limiting purposes, preferred embodiments of a micromodule as well as optical cables including a plurality of such micromodules are represented.

In the drawings.

DETAILED DESCRIPTION OF PREFERRED EMBODIMENTS

Figure 1:
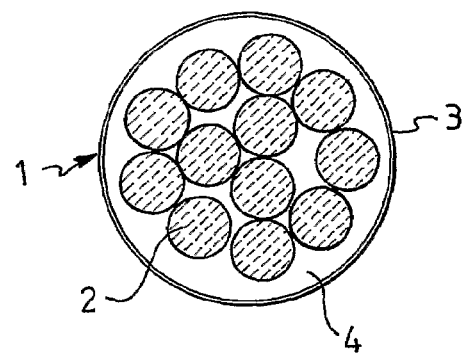
FIG. 1 is a cross-sectional view of a micromodule blocked with respect to the propagation of water of an optical cable for communication according to the invention.

With reference to FIG. 1, a micromodule blocked with respect to the propagation of water intended to be employed to manufacture an optical cable for communication according to the invention is generally indicated at 1.

The micromodule 1 comprises a plurality of optical fibers 2, for example a bundle of optical fibers, and a retaining element 3 for containing the optical fibers 2, which retaining element 3 is arranged in a radially outer position with respect to the plurality of optical fibers 2. According to the preferred embodiment shown in FIG. 1, the retaining element 3 of the micromodule 1 is made of a thermoplastic polymeric composition having an elastic module lower than 500 MPa at 20° C., an ultimate tensile strength comprised between 5 and 10 MPa, and an elongation at break comprised between 30 and 80%.

The retaining element 3 has a thickness which is preferably comprised between 0.05 and 0.2 mm, more preferably between 0.1 and 0.2 mm. In the case of a micromodule containing 12 optical fibers, such as that shown in FIG. 1, the micromodule 1 has an overall size having a maximum transversal dimension comprised between 1.25 mm and 1.45 mm.

The micromodule 1 further comprises a thixotropic filling compound 4. According to the invention, the filling compound 4 has a viscosity higher than 700 Pa·s at zero shear rate and at a first temperature of 20° C. Such value of viscosity at zero shear rate corresponds to the value of the first parameter $C_1$ of the Ellis model, which will be discussed in more detail hereinbelow. The filling compound 4 has a loss modulus G" lower than 3000 MPa at a second temperature of −45° C. and at a frequency of 1 Hz.

The filling compound 4 comprises for example a silicone oil having preferably a viscosity of 5000 mPa·s and silica preferably comprising a combination of fumed silica (e.g. CAB-O-SIL® H-5, available from Cabot Corporation, Boston, Mass.) and of hydrophobic fumed silica treated with dimethyldichlorosilane (e.g. CAB-O-SIL® TS-610). The untreated silica has preferably a B.E.T. surface area of 300 m²/g and the treated silica has preferably a B.E.T. surface area of 120 m²/g.

Preferably, the ratio by weight between the silicone oil and the silica is comprised between 20/1 and 6/1, more preferably between 20/1 and 10/1.

In particular, the viscosity of the filling compound 4 so formed is of 900 Pa·s at zero shear rate and at 20° C. and has a loss modulus G" of 1500 MPa measured at a temperature of −45° C. and at a frequency 1 Hz.

In particular, according to the preferred embodiment shown in FIG. 1, the plurality of optical fibers 2 is housed within the retaining element 3 in a loose manner. More particularly, the inner diameter of the retaining element 3 is 1.50-21% larger than the diameter of the smallest circle enveloping the optical fibers 2 defined therein.

Between the inner diameter of the retaining element 3 and the maximum transversal size of the bundle of optical fibers 2 an interspace having an average thickness of 0.1 mm is defined, which interspace is conveniently water-blocked by the filling compound 4. In order to fill all the interspaces between and around the optical fibers 2 housed in the retaining element 3, the optical fibers 2 are preferably coated with the filling compound 4 before they are passed through a die for extruding the retaining element 3.

Figure 2:
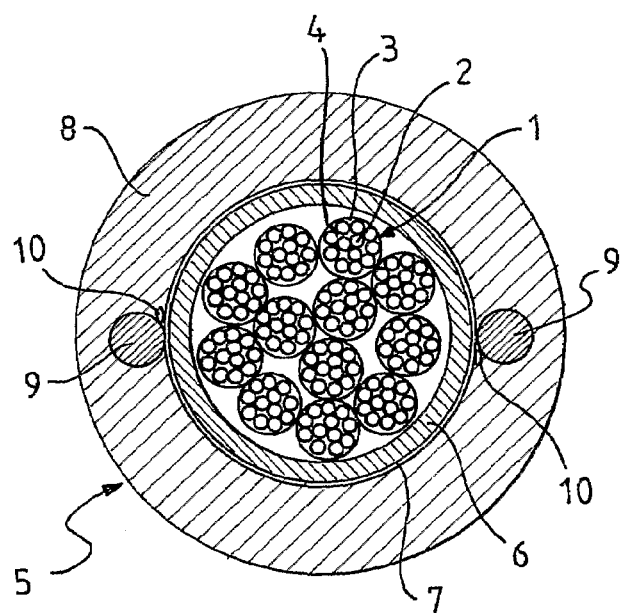
FIG. 2 is a cross-sectional view of a first type of an optical cable for communication comprising a plurality of micromodules of FIG. 1.
Figure 3:
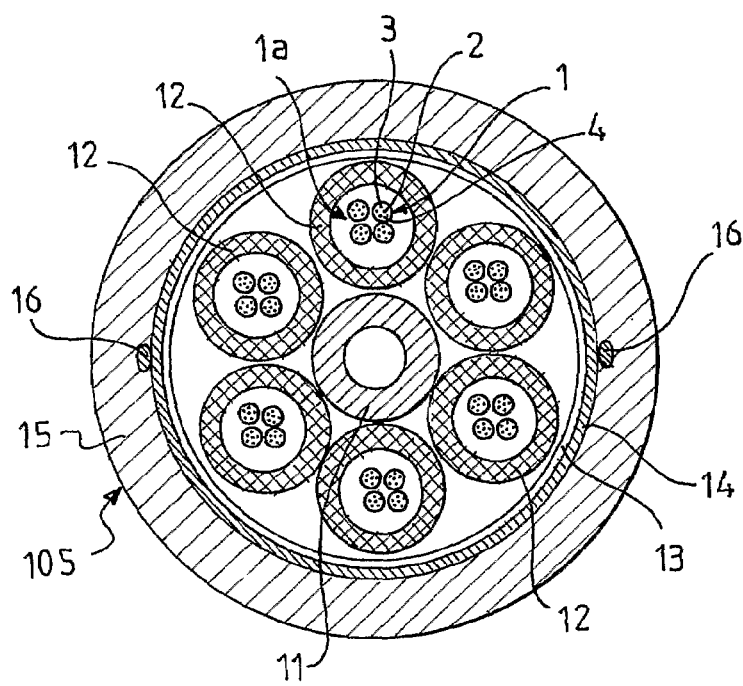
FIG. 3 is a cross-sectional view of a second type of an optical cable for communication comprising a plurality of micromodules of FIG. 1.

With reference to FIGS. 2 and 3, a loose optical cable, in particular a cable 5 of a first type, known in the art with the term of Micromodules in Central Loose Tube (M-CLT), and, respectively, a loose optical cable 105 of a second type, known in the art with the term of Micromodules in Stranded Loose Tubes (M-SLT), are disclosed.

With reference to FIG. 2, the optical cable 5 comprises, starting from the radially innermost position towards the radially outermost position, a plurality of micromodules 1 stranded according to a helix of the "SZ" type, a protective tube 6, a tape 7, an outer sheath 8 in which two opposite reinforcing longitudinal elements 9 and two opposite rip-cords 10 for cutting the sheath arranged tangentially to the inner diameter of the outer sheath 8 are embedded. Optionally, between the tube 6 and the outer sheath 8 a textile reinforcing armor may be arranged, such as for example an armor made of aramid fibers or of glass fibers. The micromodules 1 stranded according to a helix pattern of the "SZ" type are arranged around the longitudinal axis of the cable 5 in stranding portions having a first stranding direction (S-shaped) which are alternate to stranding portions having a second opposite stranding direction (Z-shaped).

With reference to FIG. 3, the optical cable 105 comprises an outer sheath 15 and a plurality of tubes 12 arranged in a radially outer position with respect to a plurality of the above-mentioned micromodules 1 and in a radially inner position with respect to the outer sheath 15. Therefore, according to the illustrative example shown in FIG. 3, the cable 105 comprises, starting from the radially innermost position towards the radially outermost position, a central reinforcing element 11, six tubes 12 stranded around the central reinforcing element 11, each tube 12 housing four micromodules 1 stranded according to a helix of the "SZ" type, a tape 13, a textile reinforcing armor 14, and an outer sheath 15 in which two opposite rip-cords 16 for cutting the sheath 15 arranged tangentially to the inner diameter of the outer sheath 15 are embedded.

The value of the viscosity of the filling compound at zero shear rate and the loss modulus G" were determined as disclosed hereinbelow.

The value of the viscosity of the filling compound at zero shear rate was conveniently determined by means of the Ellis equation which is expressed by the following formula:

$$\eta = C_1/(1+\gamma/C_2)^{c_3-1}$$

where:

$\eta$ is the viscosity;

$\gamma$ is the shear rate;

$C_1$ is a first parameter which represents the viscosity of the filling compound at zero shear rate;

$C_2$ is a second parameter which relates to the width of the range of shear rate at which the filling compound behaves according to the Newtonian model, i.e. it has a behavior according to which viscosity is independent of the shear rate;

$C_3$ is a third parameter which represents the pseudoplastic behavior of the filling compound.

So, in order to determine the value of the viscosity of the filling compound at zero shear rate, the filling compound was submitted to rheological measurements by means of a stress control rheometer Bohlin CVO 120 with a cone-and-plate 2°/40 mm measuring system. More specifically, the rheological measurements consisted of submitting a set of samples of filling compound to a continuous shear test by means of the above-mentioned rotational stress control rheometer Bohlin CVO 120. A stress sweep starting from 1 to 7000 Pa was applied in a time of 600 s at a temperature of 20° C. The results of such Theological measurements permitted to obtain a flow curve which was modeled by the Ellis equation to determine the value of the parameter $C_1$ and thus the value of the viscosity at zero shear rate and at 20° C.

As is known, the above-mentioned loss modulus G" is correlated to the viscous properties of the filling compound, which are determined by measuring the phase lag between a predetermined applied shear stress and the resulting measured shear strain.

In oscillation tests, differently from the behavior represented by Hooke's law according to which the strain is correlated to stress via a material constant called elastic modulus, stress and strain are constantly changing and only instantaneous values of the so-called viscoelastic or complex modulus G* may be measured. G* is defined as follows:

$$G^* = G' + iG''$$

wherein

G' is the storage (or elastic) modulus, i.e. the modulus representing the behavior of an elastic solid, which gives a measure of the elastic storage of energy;

G" is the loss (or viscous) modulus, i.e. the modulus representing the behavior of a viscous fluid, which gives a measure of the viscous dissipation of energy through a permanent deformation in flow;

i is the imaginary unity of complex numbers.

As is known, G' and G" are also related to the phase angle by the following formula:

$$\tan \delta = G''/G'$$

wherein G' and G" are defined as above and $\tan\delta$ is proportional to the energy dissipation due to hysteresis.

In particular, the value of the loss modulus G" of the filling compound at −45° C. and at a frequency of 1 Hz was measured by means of an oscillatory test using the above-mentioned rotational stress control rheometer Bohlin CVO 120, applying a temperature sweep test in the so-called region of linear stress response, using a 25 mm parallel plates geometry with a gap of 250 μm. To this purpose, an amplitude sweep test was firstly performed at a constant frequency of 1 Hz and at different temperatures, namely at 25° C., at 0° C. and at −20° C. applying an increasing stress in the range of 1-10000 Pa with a delay time of 2 s, in order to define the initial stress limit. Subsequently, a temperature sweep test was carried out at a frequency of 1 Hz using a target strain of 0.03, operating at a temperature range of from +25° C. to −60° C. with a cooling rate of 3° C./min.

As already mentioned, the loss modulus is a significant parameter because it is conveniently correlated to the results obtained from the measurements of optical attenuation measured in the optical fiber(s). The optical properties of the filling compound in terms of attenuation of the optical signal, in fact, were found to be within acceptable values when G" is equal or lower than or equal to 3000 MPa at 1 Hz and −45° C. In such conditions, a filling compound present in the interspaces between and around the optical fiber(s) housed in a retaining element still showed a residual capacity of absorbing the stress acting on the micromodule and on the optical fiber(s) housed therein.

Advantageously, such preferred values of the loss modulus G" allows to use a filling compound provided with an improved dissipative capability, i.e. with a mobility able to absorb and compensate the external stresses exerted on the cable.

Thanks to the above-mentioned features, the micromodule as well as the optical cable comprising the same according to the invention are advantageously blocked with respect to the propagation of water in an effective and long-lasting manner and ensure an adequate transmission capability in the whole temperature range, including low temperature, to which the micromodule and the optical comprising the same cable may be subjected during their service life.

The peculiar Theological behavior of the selected filling compound allows to prevent the water propagation along the micromodule and, furthermore, allows an easy displacement of the optical fibers inside the micromodule when cables are exposed to thermo-mechanical stresses.

The present invention is further described in the following examples, which are merely for illustration and must not be regarded in any way as limiting the invention.

EXAMPLE 1

Invention

A filling compound was prepared by mixing silicone oil having a viscosity of 5000 mPa·s at 20° C. (Wacker® AK 5000, available from Wacker-Chemie GmbH, München, Germany) and silica in a ratio of 19/1 by weight. The silica was made of a combination of fumed silica (CAB-O-SIL® H-5 having a B.E.T. surface area of 300 m$^2$/g, available from Cabot Corporation, Boston, Mass.) and of hydrophobic fumed silica treated with dimethyldichlorosilane (e.g. CAB-O-SIL® TS-610) in a ratio of 2/3 by weight.

The viscosity of the filling compound at zero shear rate at 20° C. was calculated by using the Ellis model:

$$\eta = C_1/(1+\gamma/C_2)^{c_3-1}$$

starting from a set of rheological measurements performed at 20° C. by means of the above-mentioned rotational stress control rheometer Bohlin CVO 120 by applying a stress sweep starting form 1 to 7000 Pa in a time of 600 s at a temperature of 20° C. The results of the Theological measurements defined a flow curve which was modeled by the Ellis model to determine $C_1$, i.e. the viscosity at zero shear rate at 20° C.

The viscosity at zero shear rate at 20° C. is reported in Table I. The loss modulus G" at −45° C. and at 1 Hz was measured by performing an oscillatory test by means of the rotational stress control rheometer above reported. First, in order to define the initial stress limit, an amplitude sweep test was performed at a constant frequency of 1 Hz and at a different temperatures: 25° C., 0° C. and −20° C., applying an increasing stress in the range 1-10000 Pa with a delay time of 2 s. Subsequently, a temperature sweep test was carried out at a frequency of 1 Hz using a target strain of 0.03, operating in a temperature range of from +25° C. to −60° C. with a cooling rate of 3° C./min.

The result of the measurement of the loss modulus G" at −45° C. and at 1 Hz is reported in Table II.

EXAMPLE 2

Invention

A filling compound was prepared by mixing a silicone oil having a viscosity of 5000 mPa·s at 20° C. (Wacker AK 5000, available from Wacker-Chemie GmbH, München, Germany) and silica in a ratio of 13/1 by weight. The silica was made of a combination of fumed silica (CAB-O-SIL® H-5 having a B.E.T. surface area of 300 m$^2$/g, available from Cabot Corporation, Boston, Mass.) and of hydrophobic fumed silica treated with dimethyldichlorosilane (e.g. CAB-O-SIL® TS-610) in a ratio of 5/2.2 by weight.

The viscosity of the filling compound at zero shear rate at 20° C. was calculated by means of the Ellis model as described in Example 1 and the obtained result is reported in Table I. The loss modulus G" at −45° C. and at 1 Hz was measured as in Example 1 and the obtained result is reported in Table II.

EXAMPLE 3

Comparative Example

A silicone oil Wacker®AK 6000 having a viscosity of 6000 mPa·s at 20° C. (available from Wacker®-Chemie GmbH, München, Germany) was used as filling compound. Such filling compound has a Newtonian Theological behavior, whereby its viscosity is independent of the shear rate.

The viscosity of the filling compound at zero shear rate at 20° C. was calculated by means of the Ellis model as described in Example 1 and the obtained result is reported in Table I. The loss modulus G" at −45° C. and at 1 Hz was measured as in Example 1 and the obtained result is reported in Table II.

EXAMPLE 4

Invention

A filling compound was prepared by mixing silicone oil having a viscosity of 5000 mPa·s at 20° C. (Wacker AK 5000, available from Wacker-Chemie GmbH, München, Germany and a silica in a ratio of 9.5/1 by weight. The silica was made of a combination of fumed silica (CAB-O-SIL® H-5 having a B.E.T. surface area of 300 m$^2$/g, available from Cabot Corporation, Boston, Mass.) and of hydrophobic fumed silica treated with dimethyldichlorosilane (e.g. CAB-O-SIL® TS-610) in a ratio of 7.3/2.2 by weight.

The viscosity of the filling compound at zero shear rate at 20° C. was calculated by means of the Ellis model as described in Example 1 and the obtained result is reported in Table I. The loss modulus G" at −45° C. and at 1 Hz was measured as in Example 1 and the obtained result is reported in Table II.

EXAMPLE 5

Invention

A filling compound was prepared by mixing a silicone oil having a viscosity of 4500 mPa·s at 20° C. (Bayer Silopren U 5, available from Bayer AG, Leverkusen, Germany) and silica in a ratio of 6.8/1 by weight. The silica was made of a combination of fumed silica (CAB-O-SIL® H-5 having a B.E.T. surface area of 300 m²/g, available from Cabot Corporation, Boston, Mass.) and of hydrophobic fumed silica treated with dimethyldichlorosilane (e.g. CAB-O-SIL® TS-610) in a ratio of 10.3/2.4 by weight. The obtained filling compound also contains 0.25% by weight of carbon black.

The viscosity of the filling compound at zero shear rate at 20° C. was calculated by means of the Ellis model as described in Example 1 and the obtained result is reported in Table I. The loss modulus G" at −45° C. and at 1 Hz was measured as in Example 1 and the obtained result is reported in Table II.

EXAMPLE 6

Comparative Example

A polyalphaolefin-based oil LA444 available from Hubergruppe was used as a filling compound.

The viscosity of the filling compound at zero shear rate at 20° C. was calculated by means of the Ellis model as described in Example 1 and the obtained result is reported in Table I. The loss modulus G" at −45° C. and at 1 Hz was measured as in Example 1 and the obtained result is reported in Table II.

EXAMPLE 7

Comparative Example

A hydrocarbon-based oil Unigel 200N available from Shennrzhen Unigel Telecommunication was used as filling compound.

The viscosity of the filling compound at zero shear rate at 20° C. was calculated by means of the Ellis model as described in Example 1 and the obtained result is reported in Table I. The loss modulus G" at −45° C. and at 1 Hz was measured as in Example 1 and the obtained result is reported in Table II.

TABLE I

|  | Zero shear rate viscosity at 20° C. (Pa · s) ($C_1$) |
|---|---|
| Example 1 (invention) | $9.2 \cdot 10^2$ |
| Example 2 (invention) | $1.2 \cdot 10^4$ |
| Example 3 (comparative) | 6.0 |
| Example 4 (invention) | $1.7 \cdot 10^4$ |
| Example 5 (invention) | $4.1 \cdot 10^4$ |
| Example 6 (comparative) | $3.8 \cdot 10^4$ |
| Example 7 (comparative) | $1.5 \cdot 10^4$ |

TABLE II

| Filling compound | Loss modulus G" measured at −45° C. and at 1 Hz (MPa) |
|---|---|
| Example 1 (invention) | 1600 |
| Example 2 (invention) | 1450 |
| Example 3 (comparative) | — |
| Example 4 (invention) | 1800 |
| Example 5 (invention) | 3000 |
| Example 6 (comparative) | 830 |
| Example 7 (comparative) | 540000 |

EXAMPLE 8

Test of Resistance to Water Passage

The filling compounds of Example 1-3, 6 and 7 were tested in order to evaluate the resistance to the propagation of water of the micromodules containing the same. The micromodules were manufactured by embedding in a mass of filling compound a bundle of 12 optical fibers stranded according to the "SZ" technique. For this purpose, the optical fibers were passed in a chamber containing the filling compound and thermoregulated at 100° C. The filling compound was applied in the interspaces and around the optical fibers. A retaining element made of a thermoplastic polymeric composition reported in Table VI (said retaining element having an elastic module of 260 MPa at 20° C., ultimate tensile strength of 7.8 MPa, and elongation at break of 75%) was extruded around the bundle of optical fibers embedded in the filling compound at an extrusion temperature of 140-180° C. The advancing speed of the optical fibers bundle coated with the filling compound was 50 m/min. The filling compound filled 90% of the volume defined within the retaining element. The micromodule obtained in this manner was cooled down to a temperature of 20° C.

Resistance tests according to the method F5B provided for by the International Standard IEC 60794-1-2 were performed. In particular, the resistance to water propagation of the micromodule was tested by applying a 1 m water head for 24 h at an end of a micromodule sample having a length of 1 and 3 m.

Resistance tests were also performed according to a modified method F5B, according to which a 1 m water head was applied for 15 days to sample having a length of 1 m. The results of the tests are shown in Table III. The results of the tests have been considered positive when no or slight water propagation in the micromodule was detected, in any case a propagation involving a length lower than the length of the sample.

TABLE III

| Filling compound | Method F5B (standard IEC60794-1-2) head of $H_2O$: 1 m duration: 24 h | | Modified method F5B head of $H_2O$: 1 m sample length: 1 m duration: 15 days |
|---|---|---|---|
|  | Sample length: 1 m | Sample length: 3 m |  |
| Example 1 (invention) | positive result | positive result | positive result |
| Example 2 (invention) | positive result | positive result | positive result |
| Example 3 (comparative) | negative result | negative result | negative result |
| Example 6 (comparative) | positive result | positive result | positive result |
| Example 7 (comparative) | positive result | positive result | positive result |

EXAMPLE 9

Drip Test

The filling compounds of Example 1-3, 6 and 7 were tested in order to evaluate their resistance to dripping out from the micromodules. The micromodules were produced as described in Example 8.

Vertical drip tests were performed according to the method E14 provided for by the International Standard IEC 60794-1-2. In particular, samples of micromodules having a length of 30 cm were vertically oriented and submitted to a temperature of 70° C. for 24 h. In a first test, the top free end of the samples was sealed, while in a second test, the top free end was let open.

The results are reported Table IV.

TABLE IV

| Filling compound | Drip test at 70° C. for 24 h on a 30 cm sample (% by weight of the dripped filling compound) | |
|---|---|---|
| | Sealed top free end | Open top free end |
| Example 1 (invention) | 0.0 | 0.0 |
| Example 2 (invention) | 0.0 | 0.0 |
| Example 3 (comparative) | ~10 ÷ 20 | ~30 ÷ 45 |
| Example 6 (comparative) | 0.0 | 0.0 |
| Example 7 (comparative) | ~5 | ~10 |

EXAMPLE 10

Thermal Cycle Test

The filling compounds of Example 1-3, 6 and 7 were tested in order to evaluate the attenuation of the optical fibers in the micromodules. The micromodules were produced as described in Example 8.

Thermal cycle tests were performed by submitting a sample of the micromodules having 1000 m length to thermal cycles from −40° C. to +60° C.

During the thermal cycles, at the above-mentioned temperatures of −40° C., +20° C. and +60° C. the attenuations were measured at 1550 nm and at 1625 nm. A regular behavior of the optical fibers in the cable was detected, both in terms of attenuation at +20° C. and in terms of variation of attenuation in the range of temperatures tested (−40° C.-+60° C.). The results are reported in Table V.

EXAMPLE 11

Compatability Test

The compatibility of the filling compounds of Example 1 and of Example 6 with a retaining element made of a thermoplastic polymeric composition disclosed in Table VI has been tested. The micromodules were produced as described in Example 8.

To this purpose, the obtained micromodules were subjected to a test according to CM37 Standard, item 6.2, from France Telecom. In particular:

a sample of a micromodule filled with a filling compound of Example 1 having a length of 30 cm was immersed, at 70° C., for 10 days, in the filling compound of Example 1;

a sample of a micromodule filled with a filling compound of Example 6 having a length of 30 cm was immersed, at 70° C., for 10 days, in the filling compound of Example 6.

The percentage variation of the ultimate tensile strength and of the elongation at break of the retaining element was determined. The obtained results are the following:

ultimate tensile strength (% variation): 2.5% (filling compound of Example 1), −40% (filling compound of Example 6);

elongation at break (% variation): −1.5% (filling compound of Example 1), −22% (filling compound of Example 6).

The results above reported clearly show that only the filling compound of Example 1 is compatible with the polymeric composition of the retaining element.

TABLE VI

| Compound | Amounts* |
|---|---|
| Lotryl ® 17BA07 | 60 |
| Lotryl ® 30BA02 | 14 |
| Flexirene ® CL10 | 20 |
| Lotader ® 3410 | 6 |
| Hydrofy ® GS1.5 | 94 |
| Rhodorsil ® GUM 901 | 5 |
| Anox ® 20 | 1 |

*the amounts are expressed in phr, i.e. parts by weight per 100 parts of the olefin polymer (a).

Lotryl® 17BA07 (Atofina): copolymer ethylene-butyl acrylate containing 16% to 19% by weight of acrylic ester;

Lotryl® 30BA02 (Atofina): copolymer ethylene-butyl acrylate containing 28% to 32% by weight of acrylic ester;

TABLE V

| | Measurements of optical attenuation (dB/km) | | |
|---|---|---|---|
| Filling compound | 1550 nm | 1625 nm | Test result |
| Example 1 (invention) | $\alpha_{average}$ (20° C.) = 0.19<br>$\Delta\alpha_{average}$(−40° C. ÷ +60° C.) ≦ +0.02 | $\alpha_{media}$(20° C.) = 0.20<br>$\Delta\alpha_{average}$(−40° C. ÷ +60° C.) ≦ +0.02 | Positive |
| Example 2 (invention) | $\alpha_{media}$ a 20° C. = 0.19<br>$\Delta\alpha_{average}$(−40° C. ÷ +60° C.) ≦ +0.02 | $\alpha_{average}$ (20° C.) = 0.20<br>$\Delta\alpha_{average}$(−40° C. ÷ +60° C.) ≦ +0.03 | Positive |
| Example 3 (comparative) | $\alpha_{average}$(20° C.) = 0.20<br>$\Delta\alpha_{average}$(−40° C. ÷ +60° C.) ≦ +0.02 | $\alpha_{average}$(20° C.) = 0.22<br>$\Delta\alpha_{average}$(−40° C. ÷ +60° C.) ≦ +0.02 | Positive |
| Example 6 (comparative) | $\alpha_{average}$(20° C.) = 0,.9<br>$\Delta\alpha_{average}$(−40° C. ÷ +60° C.) ≦ +0.05 | $\alpha_{average}$(20° C.) = 0.20<br>$\Delta\alpha_{average}$(−40° C. ÷ +60° C.) ≦ +0.06 | Positive |
| Example 7 (comparative) | $\alpha_{average}$(20° C.) = 0.19<br>$\Delta\alpha_{average}$(−40° C. ÷ +60° C.) ≦ +0.10 | $\alpha_{average}$(20° C.) = 0.20<br>$\Delta\alpha_{average}$(−40° C. ÷ +60° C.) ≦ +0.15 | Negative |

Flexirene® CL10 (Polimeri Europa): linear low density polyethylene;

Lotader® 3410 (Atofina): ethylene-n-butylacrylate-maleic anhydride terpolymer;

Hydrofy® GS1.5 (Sima): magnesium hydroxide coated with stearic acid;

Rhodorsil® GUM 901 (Rhodia): dimethylsiloxane, methyl vinyl terminated gum;

Dynasylan® AMEO (Sivento-Chemie): 3-aminopropyltriethoxysilane;

Anox® 20 (Great Lakes Chemical): pentaerythrityl-tetrakis-[3-(3,5-di-t-butyl-4-hydroxyphenyl)-propionate](antioxidant).

The invention claimed is:

1. An optical cable for communication, comprising at least one micromodule blocked with respect to the propagation of water, wherein said micromodule comprises:
   at least one optical fiber;
   a retaining element for housing said at least one optical fiber; and
   a thixotropic filling compound arranged within said retaining element, said filling compound having a viscosity higher than or equal to 700 Pa·s at zero shear rate and at a first temperature of 20° C. and a loss modulus G" lower than or equal to 3000 MPa at a second temperature of −45° C. and at a frequency of 1 Hz, said thixotropic filling compound being compatible with said retaining element.

2. The optical cable according to claim 1, wherein the viscosity of the filling compound is 800 to 40000 Pa·s at zero shear rate and at 20° C.

3. The optical cable according to claim 2, wherein the viscosity of the filling compound is 850 to 20000 Pa·s at zero shear rate and at 20° C.

4. The optical cable according to claim 1, wherein said filling compound has a loss modulus G" of 300 MPa to 3000 MPa at a temperature of −45° C. and at a frequency of 1 Hz.

5. The optical cable according to claim 4, wherein said filling compound has a loss modulus G" of 500 MPa and 2500 MPa at a temperature of −45° C. and at a frequency of 1 Hz.

6. The optical cable according to claim 1, wherein said filling compound fills at least 85% of the volume defined within said retaining element.

7. The optical cable according to claim 6, wherein said filling compound fills at least 90% of the volume defined within said retaining element.

8. The optical cable according to claim 1, wherein said filling compound comprises a gel obtained from at least one liquid and from at least one thickening agent.

9. The optical cable according to claim 8, wherein said liquid is selected from silicon oils, fluorinated oils, or mixtures thereof.

10. The optical cable according to claim 8, wherein said thickening agent is selected from the group of: silica, bentonite, polytetrafluoroethylene, or mixtures thereof.

11. The optical cable according to claim 9, wherein said liquid is a silicone oil.

12. The optical cable according to claim 11, wherein said silicon oil has a viscosity of 100 to 13000 mPa·s at 20° C.

13. The optical cable according to claim 10, wherein said thickening agent is a mixture of fumed silica and of an at least partially silanized silica.

14. The optical cable according to claim 8, wherein the ratio by weight between the liquid and the thickening agent is 20/1 to 6/1.

15. The optical cable according to claim 1, wherein said retaining element has a thickness of 0.05 to 0.2 mm.

16. The optical cable according to claim 15, wherein said retaining element has a thickness of 0.1 to 0.2 mm.

17. The optical cable according to claim 1, wherein said retaining element is made of a thermoplastic polymeric composition comprising:
   (a) at least one first olefin polymer, and
   (b) at least one inorganic filler.

18. The optical cable according to claim 17, wherein said thermoplastic polymeric composition further comprises at least one second olefin polymer (c) selected from: ($c_1$) terpolymers of at least one α-olefin, at least one acrylic acid ester, and at least one α,β-olefinically unsaturated dicarboxylic acid reagent or its derivatives; ($c_2$) terpolymers of ethylene, at least one α,β-olefinically unsaturated dicarboxylic acid anhydride, and at least one vinyl ester of a saturated carboxylic acid; and ($c_3$) olefin polymers grafted with at least one ethylenically unsaturated monomer.

19. The optical cable according to claim 18, wherein the derivatives of the α, β-olefinically unsaturated dicarboxylic acid reagent comprise anhydrides, metal salts, imides, esters, or at least one glycidyl acrylate.

20. The optical cable according claim 18, wherein said second olefin polymer (c) is present in the thermoplastic polymeric composition in an amount of 3 parts by weight to 10 parts by weight with respect to 100 parts by weight of the first olefin polymer (a).

21. The optical cable according to claim 17, wherein said first olefin polymer (a) is selected from: low density polyethylene, linear low density polyethylene, ultra low density polyethylene, atactic polypropylene, high and low density poly-1-butene, poly-4-methyl-1-pentene, ultra-low-molecular weight polyethylene, ethylene-based ionomers, poly-4-methyl-1-pentene, ethylene propylene copolymers, ethylene-propylene-diene copolymers, copolymer of ethylene and/or propylene with other copolymerizable monomers, ethylene-1-butylene copolymer, ethylene-vinyl acetate copolymer, ethylene-methyl acrylate copolymer, ethylene-butyl acrylate copolymer, ethylene-ethyl acetate copolymer, propylene-4-methyl-1-pentene copolymer, ethylene-vinyl alcohol copolymer; ethylene acrylic elastomers, ethylene-methyl acrylate-acrylic acid terpolymers; or mixtures thereof.

22. The optical cable according to claim 17, wherein said inorganic filler (b) is selected from: hydroxides, hydrated oxides, salts or hydrated salts of metals.

23. The optical cable according to claim 22, wherein the metal of the hydrated salts of metals comprises calcium, magnesium, aluminum, or mixtures thereof.

24. The optical cable according to claim 17, wherein said thermoplastic polymeric composition has an elastic module lower than or equal to 500 MPa at a temperature of 20° C.

25. The optical cable according to claim 17, wherein said thermoplastic polymeric composition has an ultimate tensile strength lower than or equal to 12 MPa.

26. The optical cable according to claim 17, wherein said thermoplastic polymeric composition has an elongation at break lower than or equal to 100%.

27. The optical cable according to claim 1, wherein said at least one optical fiber is housed in a loose manner within such retaining element.

28. The optical cable according to claim 1, further comprising at least one outer sheath arranged in a radially outer position with respect to a plurality of said micromodules.

29. The optical cable according to claim 1, further comprising at least one reinforcing element longitudinally embedded in said outer sheath.

30. The optical cable according to claim 29, further comprising a plurality of tubes arranged in a radially outer position with respect to a plurality of said micromodules and in a radially inner position with respect to said at least one outer sheath.

31. The optical cable according to claim 30, further comprising a central reinforcing element longitudinally extending in a central radially inner position with respect to said outer sheath, said plurality of tubes being stranded around said central reinforcing element.

32. A micromodule blocked with respect to the propagation of water comprising:
    at least one optical fiber;
    a retaining element for housing said at least one optical fiber; and
    a thixotropic filling compound arranged within said retaining element, said filling compound having a viscosity higher than or equal to 700 Pa·s at zero shear rate and at a first temperature of 20° C. and a loss modulus G" lower than or equal to 3000 MPa at a second temperature of −45° C. and at a frequency of 1 Hz, said thixotropic filling compound being compatible with said retaining element.

33. The micromodule according to claim 32, wherein said retaining element has a thickness of 0.05 to 0.2 mm.

34. The micromodule according to claim 32, wherein said retaining element is made of a thermoplastic polymeric composition comprising:
    (a) at least one first olefin polymer, and
    (b) at least one inorganic filler.

35. The micromodule according to claim 32, wherein said filling compound has a viscosity of 800 to 40000 Pa·s at zero shear rate and at 20° C.

36. The micromodule according to claim 32, wherein said filling compound has a loss modulus G" of 300 MPa to 3000 MPa at a temperature of −45° C. and at a frequency of 1 Hz.

37. The micromodule according to claim 32, wherein said filling compound fills at least 85% of the volume defined within said retaining element.

38. The micromodule according to claim 32, wherein said filling compound comprises a gel obtained from at least one liquid and from at least one thickening agent.

39. The micromodule according to claim 38, wherein said liquid is selected from silicone oils, fluorinated oils, or mixtures thereof, and wherein said thickening agent is selected from silica, bentonite, polytetrafluoroethylene, or mixtures thereof.

* * * * *